Figure 1:
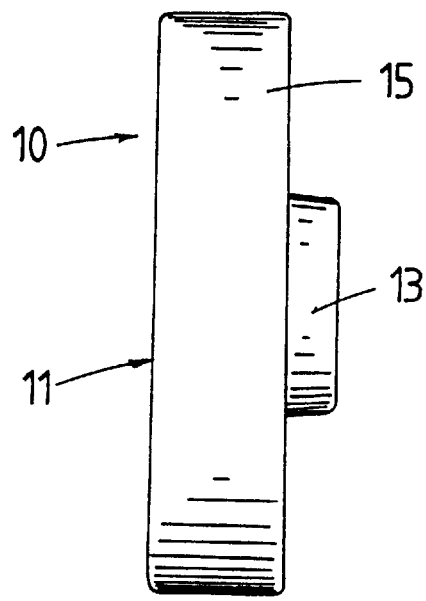

United States Patent [19]

Reboul et al.

[11] Patent Number: 5,768,813
[45] Date of Patent: Jun. 23, 1998

[54] CARRIER FOR AN ELECTRONIC IDENTIFICATION DEVICE

[76] Inventors: Jerome Reboul, 3, rue Saint-Louis-en-l'Ile, Paris, France, f75004; Petrus Augustinus Van Amelsfort, Watershed Road, RD 10, Palmerston North, New Zealand

[21] Appl. No.: 827,391

[22] Filed: Mar. 27, 1997

Related U.S. Application Data

[63] Continuation of Ser. No. 335,775, filed as PCT/NZ93/00037, May 1, 1993, abandoned.

[30] Foreign Application Priority Data

May 13, 1992 [NZ] New Zealand .................... 242727

[51] Int. Cl.⁶ ........................................... G09F 3/00
[52] U.S. Cl. ................. 40/301; 264/255; 264/272.11; 340/573; 343/788
[58] Field of Search ................ 40/301; 340/573, 340/825.54, 870.31; 343/742, 788, 866; 264/255, 272.11, 272.15

[56] References Cited

U.S. PATENT DOCUMENTS

| 547,424 | 10/1895 | Eaton | 40/301 |
|---|---|---|---|
| 1,026,423 | 5/1912 | Andrews | 40/301 |
| 2,743,308 | 4/1956 | Bardsley | 264/255 X |
| 3,671,621 | 6/1972 | Fukuoka | 264/255 X |
| 4,021,952 | 5/1977 | Brierley | 40/301 |
| 4,398,785 | 8/1983 | Hedrick | 264/255 X |
| 4,475,481 | 10/1984 | Carroll | 119/51 R |
| 4,495,130 | 1/1985 | Hedrick | 264/255 |
| 4,507,258 | 3/1985 | Aoki | 264/255 |
| 4,612,877 | 9/1986 | Hayes et al. | 40/301 X |
| 4,718,374 | 1/1988 | Hayes | 40/301 X |
| 4,721,064 | 1/1988 | Denk et al. | 40/301 X |
| 4,785,563 | 11/1988 | Friedman | 40/301 |
| 4,804,805 | 2/1989 | Antonas et al. | 264/255 X |
| 4,847,592 | 7/1989 | Hogen Esch et al. | 340/573 X |
| 4,865,044 | 9/1989 | Wallace et al. | 340/573 X |
| 4,927,580 | 5/1990 | Nasu et al. | 264/255 X |
| 5,396,215 | 3/1995 | Hinkle | 340/573 X |
| 5,419,864 | 5/1995 | Sheer et al. | 264/255 X |
| 5,461,807 | 10/1995 | Johnson | 40/301 |
| 5,521,609 | 5/1996 | Desch et al. | 343/788 |
| 5,557,259 | 9/1996 | Musa | 340/573 |
| 5,621,384 | 4/1997 | Crimmins et al. | 340/825.54 |
| 5,625,370 | 4/1997 | D'Hont | 343/788 |

FOREIGN PATENT DOCUMENTS

| 22888 | 10/1956 | Germany | 343/788 |
|---|---|---|---|
| 407853 | 1/1991 | Germany . | |
| 6-246783 | 9/1994 | Japan | 264/255 |
| 816454 | 3/1981 | U.S.S.R. | 40/301 |
| 2160153 | 12/1985 | United Kingdom | 40/301 |
| 2172837 | 10/1986 | United Kingdom | 264/255 |
| 86/00498 | 1/1986 | WIPO . | |
| 87/04900 | 8/1987 | WIPO | 343/788 |
| WO91/00686 | 1/1991 | WIPO | 40/301 |

*Primary Examiner*—Kenneth J. Dorner
*Assistant Examiner*—Andrea Chop
*Attorney, Agent, or Firm*—Blakely Sokoloff Taylor & Zafman

[57] ABSTRACT

A carrier (10) for an electronic identification device which permits the electronic device to be attached to an object to be identified. The electronic device is integrally moulded into the carrier (10). The electronic device is associated with a housing (14) which is moulded into the carrier. The housing (14) can be annular and coaxially located with an opening (12) in a panel (11) whereupon the housing (14) is encapsulated within encasing material (15) during actual moulding of carrier (10). Carrier (10) is preferably a female component of a two piece animal ear tag.

5 Claims, 4 Drawing Sheets

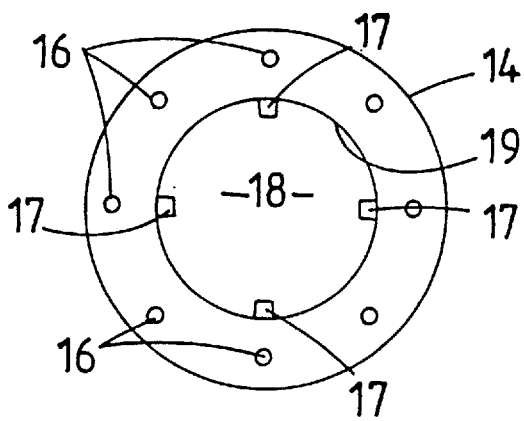
F I G. 4.
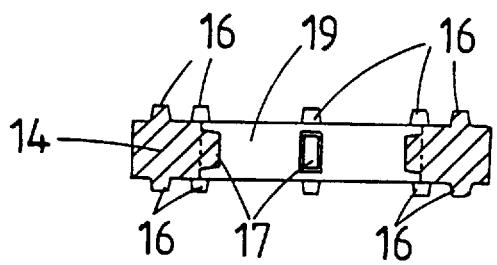
F I G. 5.
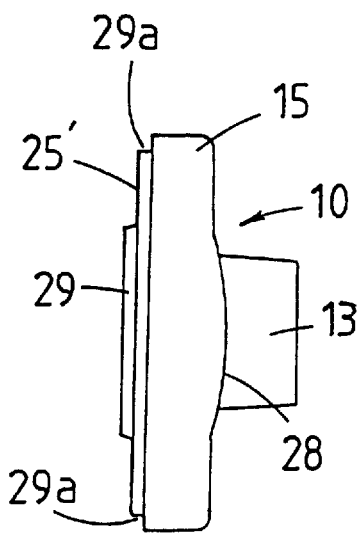
F I G. 8.
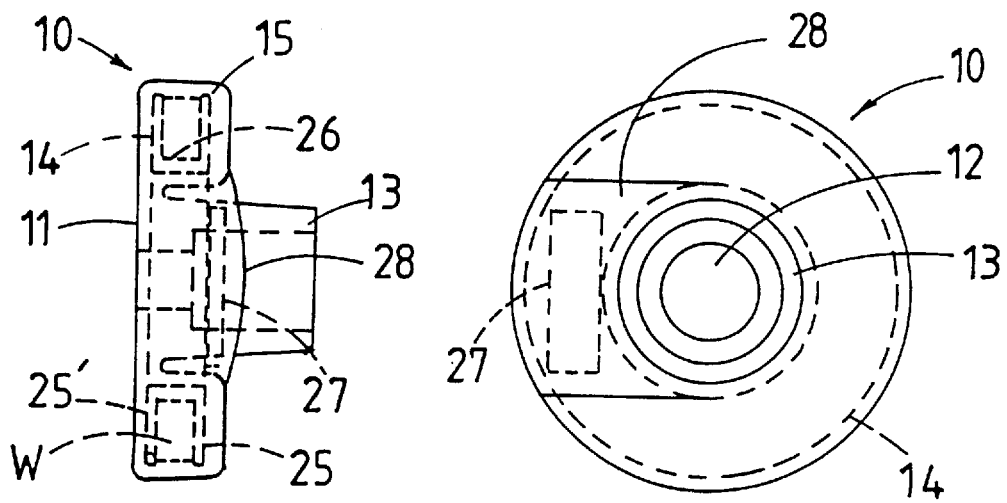
F I G. 6.   F I G. 7.

CARRIER FOR AN ELECTRONIC IDENTIFICATION DEVICE

This is a continuation of application Ser. No. 08/335,775, filed as PCT/NZ93/00037, May 13, 1993, now abandoned.

THIS INVENTION RELATES TO A CARRIER FOR AN ELECTRONIC IDENTIFICATION DEVICE.

The carrier according to the invention provides a means of attaching an electronic identification device to an object to be identified. The object to be identified can, for example, be an animal.

It is known to provide electronic identification devices which are attachable to an animal in order to provide electronic identification of the animal. This is achieved by mounting an electronic identification device with the animal and then obtaining a signal from the device, this signal being "read" by an interrogator device. In a known form the electronic identification device can be implanted in the animal.

A second method of attaching the identification device is to use an externally mountable attachment member or carrier and more particularly an animal ear tag or component thereof. The identification device is mounted with the ear tag or tag component in an operation which takes place after manufacture of the tag or tag component. For example, U.S. Pat. No. 4,718,697 discloses a means of incorporating an electronic device within a cavity formed by fastening together two panels of a preformed ear tag component. While this arrangement has proved to be effective the operation of positioning the electronic device and combining the two tag panels together leads to increased manufacturing operations and consequently end cost. Also the overall weight and physical dimensions of the tag can be a relevant factor.

An object of the present invention is to provide a carrier for an electronic identification device with the electronic identification device being incorporated with the carrier in a manner which obviates or lessens the need for separate manufacturing operations to incorporate the electronic device with the carrier.

In one broad aspect of the invention there is provided a carrier for an electronic identification device said carrier being constructed such as to be, in use, engageable with a co-operating component whereby the carrier and co-operating component can be joined together to facilitate attachment of the carrier to an object to be identified, said carrier being characterized in that it has integrally moulded therein said electronic identification device.

In the preferred form of the invention the electronic identification device is located with a housing which can be substantially annular. The housing is moulded into the plastics material which forms the or at least part of said carrier. In one preferred form the housing includes a plurality of outwardly projecting studs.

According to one form of the invention the housing is constructed from a plastics material which bonds with the plastics material from which the carrier is constructed. The housing material can be a polycarbonate and the carrier material a polyurethane.

According to a preferred form of the invention the carrier forms or incorporates one of the male or female components of a two piece animal ear tag.

The following more detailed description of the invention will describe the invention as being part of a two piece animal ear tag formed by male and female components. This is by way of example only and the invention is not restricted solely thereto.

A two piece animal ear tag comprises a male component having a panel from which projects a stem having an enlarged head portion. The female component has a panel in which an opening is located. In use of the tag the headed stem is passed through the ear of the animal so as to engage through the opening in the female component and thereby couple the male and female components such that the respective panels are located on opposite sides of the animal's ear. A preferred construction of the headed stem and co-operating opening in the female component is, for example, described in U.S. Pat. No. RE31,632. A further example of a suitable construction can be found in U.S. Pat. No. 4,653,208.

IN THE DRAWINGS

Figure 2:
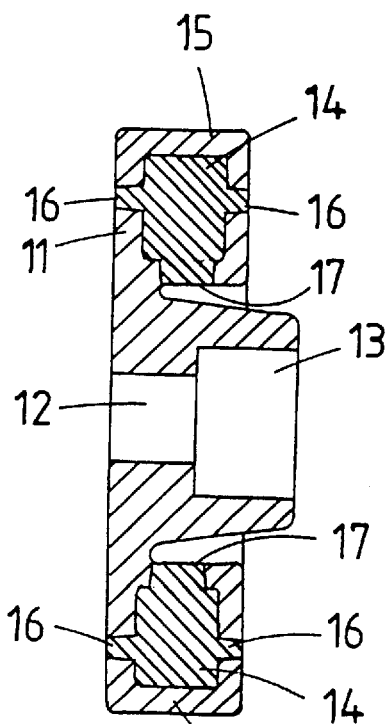
Figure 3:
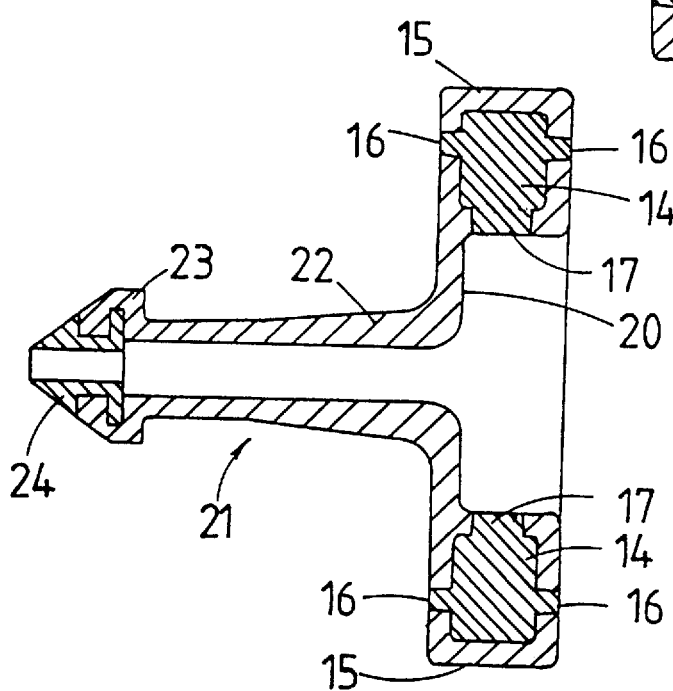
Figure 9:
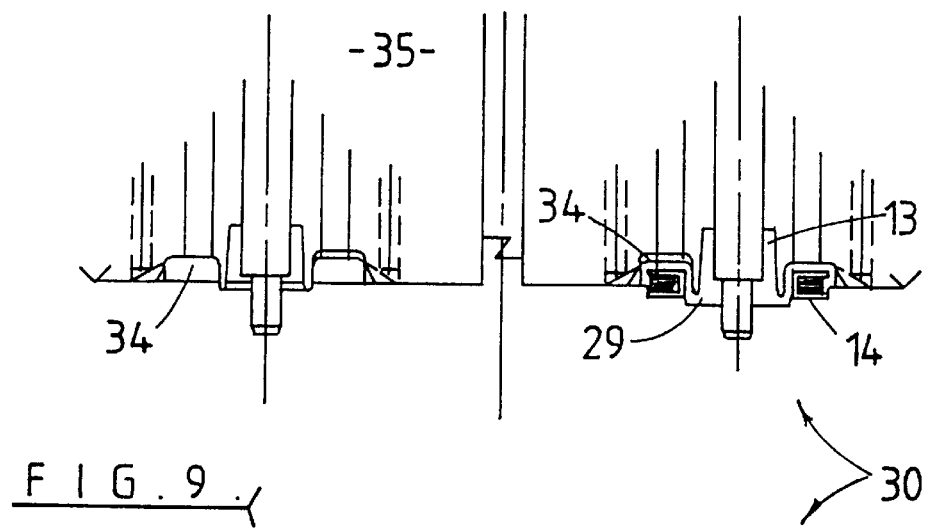
Figure 10:
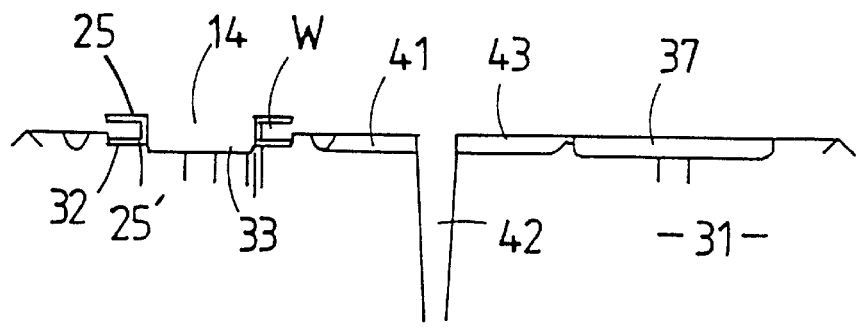
Figure 10:
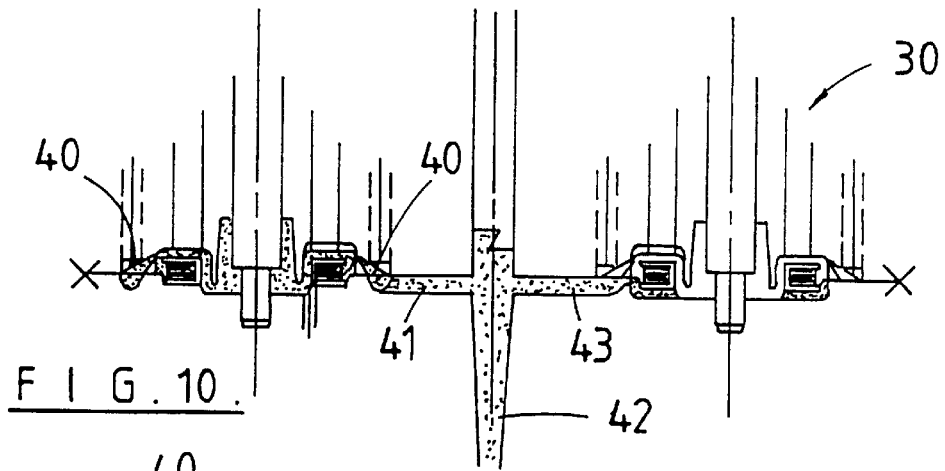
Figure 12:
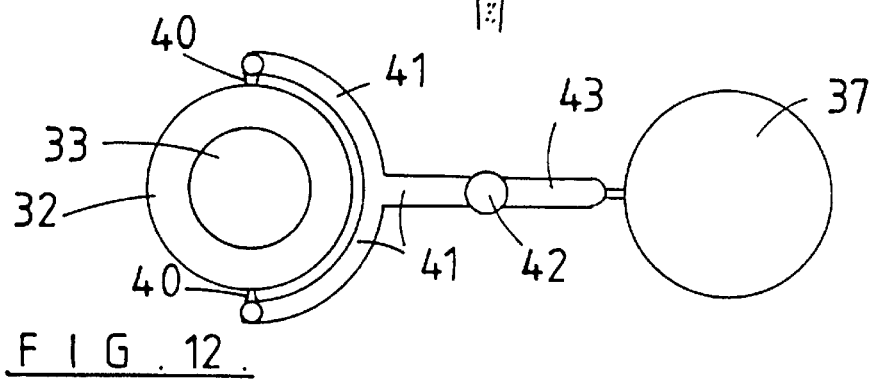
Figure 11:
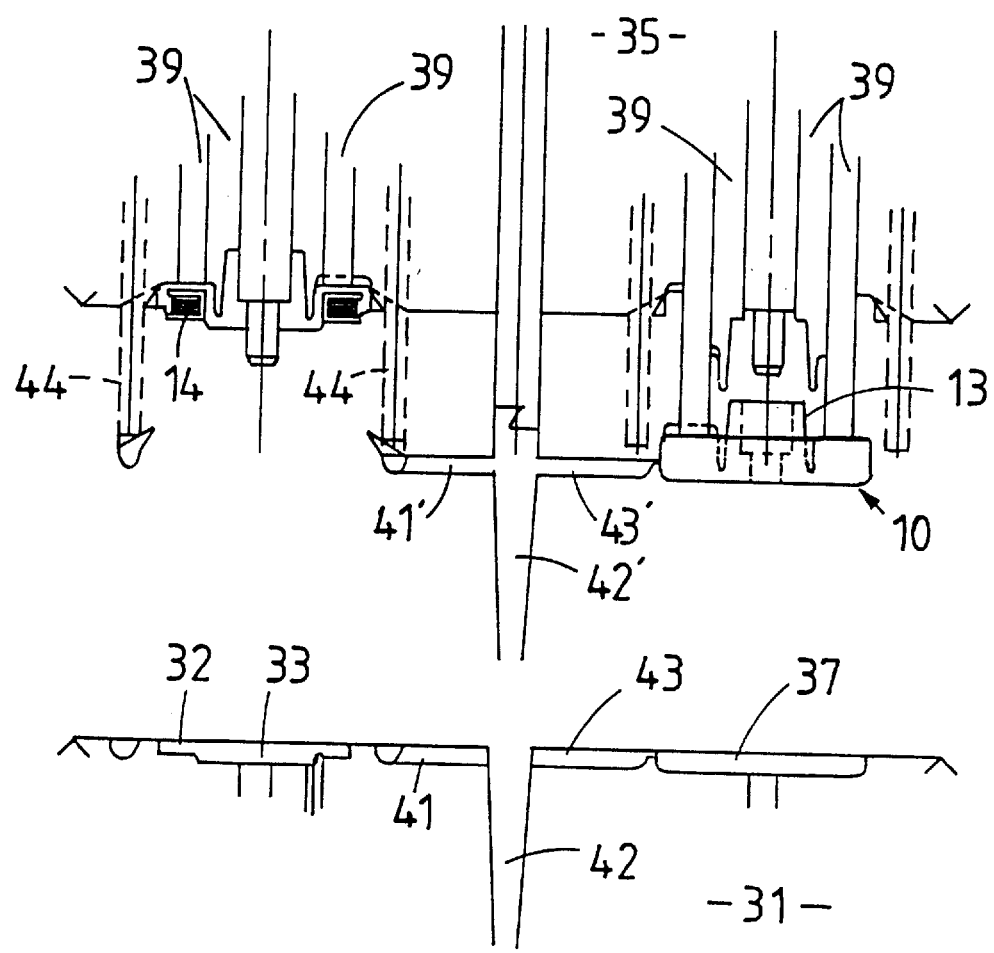

FIG. 1 is an elevation view of a female ear tag component incorporating the invention, FIG. 2 is a sectioned elevation of the component illustrated in FIG. 1, FIG. 3 is a view similar to FIG. 2 but showing a male ear tag component incorporating the invention, FIG. 4 is a plan view of the housing in which the electronic identification device is housed, and FIG. 5 is a cross-sectional elevation view of the housing shown in FIG. 4, FIG. 6 is an elevation view of a further form of the invention as shown in FIGS. 1 and 2, FIG. 7 is a plan view of the arrangement of FIG. 6, FIG. 8 is a view of the carrier after part moulding thereof, FIGS. 9, 10 and 11 are cross-sectional illustrations of the two halves of a moulding tool suitable for production of the carrier according to the present invention, and FIG. 12 is an illustration of the runner system of the moulding tool shown in FIGS. 9 to 11.

In FIGS. 1 and 2 the female component 10 comprises the carrier for the electronic device. The female component comprises a panel 11 which in the illustrated form is disc like being circular in shape. Centrally located in panel 11 is an opening 12 and a boss 13 is located about the opening 12.

Integrally moulded with component 10 is a housing 14 which is encapsulated within an outer plastics housing 15 which projects from the surface of panel 11 in the same direction as boss 13. Housing 14 is of annular shape and in the preferred form of the invention is located coaxially with the axis of opening 12.

As shown in FIGS. 4 and 5 housing 14 includes a plurality of studs 16 which project from the outer surfaces thereof. Preferably further studs 17 project into the open centre 18 of the housing from inner wall surface 19.

It will be appreciated that housing 14 is hollow and an electronic identification device is located therewithin. The construction of the electronic identification device is not important so far as the present invention is concerned and therefore a detailed description thereof is not required.

The female component 10 is moulded from a plastics material which is generally polyurethane. It is manufactured according to known injection moulding techniques. Accordingly housing 14 is located into the moulding die and is positioned therein with studs 16 locating and supporting the housing relative to the opposing face surfaces of the die halves. Studs 17 locate with a part of the die such that housing 14 is correctly located so as to be concentric with the axis of opening 12. Injection moulding of the component 10 takes place in accordance with normal operating procedures.

As a consequence housing 14 with the enclosed electronic identification device is totally encapsulated within a plastics material encasement 15. Such encapsulation therefore takes place as an integral part of the moulding of the female component.

In a preferred form of the invention housing 14 is formed from a polycarbonate material such that a bonding takes place between housing 14 and the polyurethane material. While studs 16 and 17 serve a prime purpose of locating the housing 14 in the moulding die they also provide a good anchorage between housing 14 and the surrounding plastics material 15.

The carrier is attachable to an animal's ear using a standard male or conventional component which is preferably of the type sold under the ALLFLEX trade mark and as described in U.S. Pat. No. RE31,632 or 4,653,208. Thus a male component having a circular panel and the carrier as shown in FIGS. 1 and 2 are placed in an applicator tool whereupon the stem of the male component is driven through the animal's ear so as to pass through opening 12 and thereby fasten the male and female components together with the panel of the male component on one side of the ear and the carrier on the other side of the ear.

If improved retention characteristics are required a collar of the type described in U.S. Pat. No. 4,953,313 can be incorporated within the boss 13 of the female component. Alternatively for greater security boss 13 can be enclosed by an end wall and a collar arrangement of the type described in U.S. Pat. No. 4,635,389 can be located therewithin. The end wall to the collar can be applied as a post moulding operation. For example, the end wall can be a disc which engages over and is adhered to the end of the boss 13 as, for example, shown in French patent 2487634.

As an alternative to the arrangement described in U.S. Pat. No. 4,953,313 where the collar is inserted as a post moulding operation the boss can be moulded in an open ended form as illustrated in the present drawings with the collar then placed therein and an enclosing end wall fastened to the boss as described above. In yet a further form of the foregoing arrangements the insert can be provided with an outwardly extending radial flange which engages over the end of boss 13. An end cap can then be fitted to the radial flange in a fixed manner. For example, the end cap can be a disc having an annular wall which fits into the end of the collar. A radial projection is provided on the outer surface of the annular wall and engages in a snap lock arrangement in a peripheral groove formed in the inner wall surface of the collar or the radial flange.

The applicator tool for applying the male component and carrier to the animal's ear can be of any known construction and the applicator tools as described in U.S. Pat. Nos. 4,531,520 and 4,516,577 are eminently suited for this purpose.

In an alternative arrangement as shown in FIG. 3 the housing 14 is encapsulated with panel 20 of a male component 21. In accordance with the construction as disclosed in U.S. Pat. No. RE31,632 a stem 22 extends from panel 20 and has provided at the end thereof a head 23 in which a hard material tip 24 is located. Stem 22 can in accordance with the long known technique include adjacent head 23 a stepped portion (not shown), this stepped portion locating within the thickness of the female component through which opening 12 passes. This stepped portion thus provides a shoulder which engages against the surface of panel 11 of the female component which locates against the surface of the animal's ear. Consequently the female component is prevented from moving back down the stem and thereby applying pressure caused by any sandwiching effect of the panels of the male and female components to the animal's ear. Such pressure is preferably avoided so as to prevent pressure necrosis of the ear.

The male component as shown in FIG. 3 is used with a standard female component of the type sold under the ALLFLEX trade mark. The female component can include one or other of the insert arrangements as aforesaid. Once again the male component can be applied using known applicator tools though in view of the additional length of the tag due to housing 14 and its encapsulating material 15 the length of the applicator pin will need to be increased such that the pin correctly interacts with the hard material tip of the tag.

Other forms of tag components incorporating the present invention are possible. For example, in FIGS. 6 and 7 the hollow annular housing 14 is open sided such that the housing takes the form of a bobbin having side flanges 25 and 25' and a central wall 26. Wire W forming the antennae of the electronic identification device 27 can then be wound onto the bobbin with the electronic identification device 27 being mounted on the outside surface of flange 25.

To accommodate the electronic identification device 27 a recess is formed in the moulding die cavity such that a curved raised portion 28 results in the as moulded product. The device 27 is therefore covered and protected by substantially the same thickness of plastics material as the rest of bobbin 13.

To manufacture the tag of FIGS. 6 and 7 a special die and injection moulding technique can be employed. According to this technique one die half 31 of the moulding tool 30 includes a shaped recess 32. Flange 25' is located and be held in place, e.g. sucked into recess 32 by sub-atmospheric pressure applied to flange 25'. The remainder of the die cavity 33 with which recess 32 is associated and cavity 34 of other die half 35 are such that after the moulding operation has taken place the component is moulded to the extent shown in FIG. 8. That is, all of the plastics to be moulded about bobbin 14 is in place except for in the area of flange 25'.

It will be noted that in FIG. 8 the plastics material is showing as having flowed into the area bounded by the inner faces of flanges 25 and 25' and the periphery of the antennae wound onto bobbin 14. This aids in the positive location of the bobbin 14 in the moulded end product.

In a second moulding operation the component in the form shown in FIG. 8 is placed in a suitably shaped die cavity which permits plastic to mould over the surface of flange 25' from the disc portion 29 (FIG. 8) round and into the stepped portion 29a (FIG. 8).

This moulding technique is conveniently carried out by use of the illustrated moulding tool in which die part 31 is fixed in position and die part 35 movable toward and away from the fixed die part. The fixed die part 31 is, however, rotatable about axis 36. Thus in its simplest form the moulding tool 30 is constructed so that the movable die part 35 has two moulding cavities 34. The fixed but rotatable die part 31 has two cavities, one being cavity 33 with recess 32 and results in the moulding of disc portion 29 as shown in FIG. 8. The other cavity 37 in the fixed die part 31 is shaped so as to facilitate moulding of the plastic in the second moulding operation i.e. complete moulding of the carrier.

Thus in a typical moulding operation a bobbin 14 is positioned in recess 32 in cavity 33 of fixed die part 31. With the die parts 31 and 35 moved together (i.e. closed as shown in FIG. 10) moulding takes place. The dotted shading shows the flow of plastic material along the runner system and into the moulding cavities.

The die parts then move apart (FIG. 11) which due to the greater frictional contact between the partially moulded component (i.e. that of FIG. 8 configuration) and the cavity in the movable die part causes the partially moulded component to remain with the movable die part 35, i.e. in cavity 34. The fixed die part 31 is then rotated so that cavity 33 is located opposite empty cavity 34. A bobbin 14 is inserted into cavity 33 prior to or following rotation. When the die parts 31 and 35 are once again brought together for moulding to take place the aforementioned moulding operation on the bobbin 14 occurs. However, at the same time the remainder of the moulding operation on the previously moulded part is carried out. When the die parts open ejectors 39 operate to release the fully moulded component whereupon die part 31 once again rotates (a new bobbin inserted into cavity 33 of the die part 31) and the die parts are then brought together to carry out a further moulding operation.

Thus in each moulding cycle one component is partially moulded while moulding of the previously partially moulded component still within the die is completed. As ejectors 39 need to be provided with each cavity in the movable die part 35 the computer controlled operation of the moulding equipment needs to incorporate means of sequencing ejectors 39 so that they operate only in the cavity in which a fully moulded component resides.

To ensure that the bobbin 14 is not shifted under the 30 pressure of the inflowing plastics during initial moulding submarine gates 40 (FIG. 10) are provided in cavities 34 such that the plastic flows via runners 41 into the cavity in a manner which applies equal and substantially opposite pressure to the bobbin. As shown in FIG. 12 plastic flows, at each moulding operation, from central runner 42 into runners 41 and 43 the latter being coupled to cavity 37. As the die parts 31 and 35 open ejectors 44 operate to eject the plastic material (Sprue) 41'.42',43' from the runners.

By use of the aforementioned moulding technique the bobbin does not require studs 16 and 17. Thus the bobbin is fully encased within the plastics material and the externally located portions of studs 16 and 17 as shown in FIGS. 2 and 3 are not present. This construction and technique is also applicable to a male tag component.

The construction according to the present invention provides both male and female carrier components which exhibit good weight characteristics despite the additional housing and electronic device and provide an overall panel shape which is compact and has minimal snagability characteristics. If desired, however, the encapsulating material 15 can be profiled so as to further enhance the shape of the carrier in order to avoid snagging. The construction as shown in FIG. 3 also preserves stem flexibility which is a highly desirable feature in order to prevent the tag being snagged and thereby ripped from the animal's ear. By incorporating the electronic identification device into the tag at the point of manufacture of the carrier manufacturing economics are very favourable.

We claim:

1. A carrier that is engageable with a cooperating component to attach said carrier to an object to be identified, said carrier comprising:
    a) an electronic identification device, said electronic identification device having a wire that forms an antenna of said electronic identification device; and
    b) a housing for holding said electronic identification device, wherein the housing substantially annular bobbin having a flange; wherein the wire forming the antenna of said electronic identification device is wound onto said bobbin; and wherein said electronic identification device is mounted in said housing with said flange, said housing being integrally molded in said carrier after receiving said electronic identification device.

2. The carrier as claimed in claim 1 wherein the housing is constructed from a first material and the carrier is constructed from a second material.

3. The carrier as claimed in claim 2 wherein the first material is a polycarbonate and the second material is a polyurethane.

4. The carrier as claimed in claim 1 wherein the carrier is incorporated in a female component of a two piece animal ear tag.

5. The carrier as claimed in claim 1 wherein the carrier is incorporated in a male component of a two piece animal ear tag.

* * * * *

UNITED STATES PATENT AND TRADEMARK OFFICE
CERTIFICATE OF CORRECTION

PATENT NO. : 5,768,813
DATED : June 23, 1998
INVENTOR(S) : Reboul et al.

It is certified that error appears in the above-identified patent and that said Letters Patent is hereby corrected as shown below:

In claim 1, at line 25, the phrase --the housing is a substantially annular bobbin-- should replace the phrase --the housing substantially annular bobbin--.

Signed and Sealed this

Eleventh Day of April, 2000

Q. TODD DICKINSON

Attest:

Attesting Officer

Director of Patents and Trademarks